United States Patent [19]

Stoveken

[11] 4,276,339
[45] Jun. 30, 1981

[54] LAMINATED FOAM-CREPED PAPER PRODUCT AND METHOD OF PRODUCTION THEREOF

[76] Inventor: F. Raymond Stoveken, 28 Meadow La., East Windsor, N.J. 08520

[21] Appl. No.: 99,513

[22] Filed: Dec. 3, 1979

[51] Int. Cl.³ .............................. B32B 3/28; B32B 5/20
[52] U.S. Cl. ........................................ 428/153; 156/79; 427/244; 427/373; 427/391; 428/154; 428/314; 428/318; 428/514
[58] Field of Search .............. 428/153, 154, 314, 310, 428/514, 318; 156/79; 427/244, 373, 391

[56] References Cited

U.S. PATENT DOCUMENTS

| Re. 27,820 | 11/1973 | Politzer et al. | 156/79 |
|---|---|---|---|
| 1,265,132 | 5/1918 | Stokes | 162/112 |
| 2,853,411 | 9/1958 | Riley | 428/314 |
| 3,062,698 | 11/1962 | Aykanian | 428/314 |
| 3,205,120 | 9/1965 | Flanders | 428/314 |
| 3,285,800 | 11/1966 | Bartell et al. | 428/314 |
| 3,365,532 | 1/1968 | Maskey et al. | 428/318 |
| 3,424,643 | 1/1969 | Lewis, Jr. et al. | 428/154 |
| 3,506,533 | 4/1970 | Berner | 428/314 |
| 3,511,788 | 5/1970 | Keil | 428/314 |
| 3,530,030 | 9/1970 | Adams et al. | 156/82 |
| 3,600,262 | 8/1971 | Frank | 428/513 |
| 3,600,265 | 8/1971 | Wolinski | 428/314 |
| 3,607,341 | 9/1971 | Goins et al. | 428/314 |
| 3,677,858 | 7/1972 | Sokolowski | 428/314 |
| 3,687,797 | 8/1972 | Wideman | 428/154 |
| 3,813,262 | 5/1974 | Shelton et al. | 428/153 |
| 3,822,176 | 7/1974 | Harrison | 428/153 |
| 3,862,879 | 1/1975 | Barron et al. | 427/373 |
| 3,895,154 | 7/1975 | Kapral | 428/153 |
| 3,925,127 | 12/1975 | Yoshioka | 428/318 |
| 4,000,028 | 12/1976 | Hoey | 428/314 |
| 4,018,647 | 4/1977 | Wietsma | 427/391 |
| 4,069,366 | 1/1978 | Hoey | 428/314 |
| 4,075,382 | 2/1978 | Chapman et al. | 428/192 |

FOREIGN PATENT DOCUMENTS

| 55644 | 12/1970 | Australia | |
| 659652 | 3/1963 | Canada | 428/512 |
| 2137704 | 2/1973 | Fed. Rep. of Germany | 428/314 |

*Primary Examiner*—William J. Van Balen
*Attorney, Agent, or Firm*—Burns, Doane, Swecker & Mathis

[57] ABSTRACT

A laminated foam-creped paper product and method of production thereof are disclosed. The laminated paper product exhibits increased wet strength and bulk and is highly absorbent, while also possessing cloth-like tactile properties. The foam layer is derived from an aqueous solution or dispersion of a film-forming material, and is caused to set soon after formation on the creped paper layer to prevent release of the crepe while minimizing penetration of the foam into the creped paper.

19 Claims, No Drawings

4,276,339

LAMINATED FOAM-CREPED PAPER PRODUCT AND METHOD OF PRODUCTION THEREOF

BACKGROUND OF THE INVENTION

The present invention relates to improved laminated foam-creped paper products and methods of producing such laminates.

Laminated paper products which contain at least one layer of paper (either creped or non-creped) bonded to a foamed layer have been known for some time. Such products exhibit increased strength and bulk as compared to non-laminated products. For example, U.S. Pat. No. 3,687,797, issued to Wideman, discloses a resilient cellulosic wadding product useful as a disposable towel, washcloth, or covering which comprises an outer layer of cellulosic wadding (e.g. creped wadding) and a second outer layer of flexible, open-celled polymeric foam which is adhesively joined to said wadding. U.S. Pat. No. 3,285,800, issued to Bartell et al, discloses a cushioning and wrapping laminate which consists of a sheet of polystyrene foam fused to a facing sheet of light cloth or creped paper. In addition, U.S. Pat. No. 3,530,030, issued to Adams et al, discloses a textile substitute comprising a substrate of a thin, flexible, permeable cellular polymeric material which is adhesively laminated to a paper sheet such as creped paper. U.S. Pat. No. 3,366,532, issued to Maskey et al, discloses an absorbent paper laminate wherein the paper layers are bonded together with regenerated cellulose in the form of a viscose foam. The laminate may be subjected to various finishing steps (e.g. creping) to impart specific characteristics to the product.

One disadvantage of certain of the laminated paper products of the above-discussed patents, however, is the use in their production of thermal fusion or an adhesive to bond a preformed foamed layer to the paper layer. Such methods of lamination are costly, time consuming, and can greatly affect the physical characteristics (e.g., absorbency and flexibility) of the laminated product.

In addition, the use of a creping procedure as a finishing step to impart specific surface characteristics to a laminated foam-paper product results in the destruction of portions of the foam structure, decreasing the absorbency and flexibility of the laminate, as well as affecting the tactile properties thereof.

It is therefore highly desirable to provide a more efficient and effective process for the production of a laminated paper product which will provide a product having high absorbency and flexibility as well as enhanced cloth-like tactile properties and wet strength in comparison to conventional laminated products of either creped or non-creped paper.

OBJECTS AND SUMMARY OF THE INVENTION

It is therefore an object of the present invention to provide a laminated foam-creped paper product which is highly absorbent.

It is another object of the present invention to provide a laminated foam-creped paper product having cloth-like tactile properties.

It is yet another object of the present invention to provide a laminated foam-creped paper product which is highly flexible.

It is still yet another aspect of the present invention to provide a laminated foam-creped paper product which exhibits improved absorbency, wet strength, and tactile properties in comparison to laminated non-creped paper products.

It is still yet another object of the present invention to provide a method for the production of a laminated foam-creped paper product which enables the paper product to be produced without significantly impairing its absorbency.

It is also another object of the present invention to provide a method for the production of a laminated foam-creped paper product which is simple and efficient.

It is still another object of the present invention to obviate the disadvantages of the prior art as outlined above.

In one aspect of the present invention there is thus provided a method for the production of a laminated foam-creped paper product which exhibits improved wet strength and bulk, and is highly absorbent comprising:

forming an unset and ungelled foamed film of an aqueous dispersion or solution of a film-forming material on at least one surface of a layer of creped paper; and causing said foamed film to set or gel such that the amount of moisture absorbed by the paper from the film prior to said setting or gelling is insufficient to cause the crepe in the paper to be released, whereupon a laminate is formed having a set or gelled foamed film which is bonded to the creped paper.

In another aspect of the present invention there is provided a method for the production of a laminated foam-creped paper product which exhibits improved wet strength and bulk, and is highly absorbent comprising:

forming an unset and ungelled foamed film of an aqueous dispersion or solution of a film-forming material between opposing surfaces of two layers of creped paper; and causing said foamed film to set or gel such that the amount of moisture absorbed by the paper from the film prior to said setting or gelling is insufficient to cause the crepe in the paper to be released, whereupon a laminate is formed having a set or gelled foamed film which bonds said layers of paper together.

In yet another aspect of the present invention, there are provided laminated foam-creped paper products produced according to either of the above methods.

DETAILED DESCRIPTION OF THE INVENTION

It has been found that the laminated foam-creped paper products of the present invention exhibit increased bulk and wet strength in comparison to conventional paper products comprised of non-creped paper. In addition, the products of the present invention are highly absorbent and exhibit a cloth-like tactile sensation due, in part, to the presence of the creping in the paper.

The laminated paper products of the present invention may take several forms. For example, the product may comprise a laminate of at least two layers of creped paper bonded together with a set or gelled foamed film derived from an aqueous solution or dispersion of a film-forming material located between the creped paper layers. The laminated product may also comprise a laminate of a single layer of creped paper having bonded to at least one surface thereof a set or gelled foamed film derived from an aqueous solution or dispersion of a film-forming material.

Any suitable type of paper substrate (e.g., in the form of separate layers or webs) may be used as long as the paper is creped or may have a crepe imparted thereto prior to formation of the foam thereon. The presence of the crepe in the paper enables the laminated product to exhibit high wet strength and absorbency as well as provide a highly desirable cloth-like tactile sensation (especially in a wet state). It has been found that the presence of the crepe in the paper substrate also greatly enhances the flexibility of the laminated paper product, thus enabling a product to be produced which exhibits cloth-like draping characteristics. The enhanced flexibility is due to the fact that as the product is subjected to bending, the stresses which act upon the side of the laminate being stretched are compensated for by corresponding stretch within the crepe of the paper. The crepe exhibits some resiliency and will thus substantially return to its original form upon cessation of the bending forces due to the bonding between the foam matrix (formed upon setting or gelling of the foamed layer) and the creped paper. This characteristic of the crepe allows the laminated product to exhibit cloth-like flexibility and draping characteristics when dry as well as being soft and possessing excellent drapability when wet.

The foam-creped paper laminate of this invention is also highly absorbent due to the fact that the creping effect greatly increases the bulk as well as the surface area of the paper. As a direct result, high absorbency is exhibited due to the capillary action of the creped paper. It is therefore essential that the creped paper which is employed in the laminated paper product of the present invention retain its crepe subsequent to the formation of the foam on the paper.

The creped paper which is employed in the present invention may be produced by conventional methods. For example, the paper may consist of "dry crepe" paper produced by a dry creping process (e.g., using the Yankee-Fourdrinier process). The crepe paper may also consist of "wet crepe" paper produced by passing moistened paper over a roll equipped with a doctor blade which imparts a crepe to the paper.

The crepe paper may be of any suitable thickness and bulk. For example, lightweight paper such as creped tissue paper may advantageously be employed in the laminated product of the present invention. Tissue weight paper generally has a single ply weight of about 7 to 18 pounds per ream. Towel weight paper may also be used and generally has a single ply weight of about 15 to 75 pounds per ream. Single or multi-ply paper may be used. The paper layer is also preferably untreated, i.e., the surface characteristics of the paper need not be modified prior to the preparation of the laminate by application of water repellant agents or the like.

For normally contemplated uses, the crepe paper employed in the product of this invention will generally have a thickness ranging from about 2 mils to about 30 mils. A particularly advantageous thickness (i.e., the thickness of tissue paper) ranges from about 2 to 6 mils, and is most preferably about 3 mils.

The film-forming material from which the foamed film layer is formed may be selected from a wide variety of conventional water-soluble or water-dispersible materials. However, the aqueous solution or dispersion of the film-forming material must be capable of being foamed, with the resulting foam then being set or gelled (i.e., stabilized) to produce a foamed layer or film which becomes bonded to the creped paper during the setting or gelling process.

For example, the foamed layer may be made from conventional synthetic latexes comprised of various polymers and copolymers. Exemplary polymers and copolymers include those made from styrene, vinylidene chloride, vinyl chloride, acrylonitrile, butadiene, urethane, vinyl esters, and acrylic esters. Cellulose derivatives such as methyl cellulose, carboxymethyl cellulose, and cellulose ether may be employed in an aqueous solution to provide a foamable aqueous solution. Other desirable film-forming materials which are suitable for use in the present invention include polyacrylic acid salts, polyacrylamide, and acrylamide copolymers. Additional desirable film-forming materials include polyethylene oxide, polyvinyl alcohol, polyvinylpyrrolidone, starch and its derivatives, casein, and guar gum. This listing is not all-inclusive and one or ordinary skill in the art would readily understand which materials were appropriate for use in the present invention. Blends of suitable film-forming materials may also be employed in a foamable dispersion or solution.

Aqueous dispersions of synthetic latexes are marketed commercially. Such latex dispersions are either non-cross-linking, self cross-linking, or cross-linkable. Exemplary commercial products are marketed under the trade-names Geon and Hycar by the B. F. Goodrich Chemical Company. The formulation of such dispersions and solutions is well within the skill of the practitioner in the art.

The density of the foamed aqueous dispersion or solution of the film-forming material will generally range from about 0.05 to about 0.50 grams/cc. Various fillers such as bentonite clay, kaolin clay, diatomaceous earth, or colloidal silica may be added to the foamed solution in order to increase the solids content and the density thereof if desired.

Other conventional additives may be used in conventional amounts in order to modify specific characteristics of the foam. Thickeners such as cellulose derivatives may be used to increase the viscosity of the solution without materially additionally increasing the solids content thereof. Foam stabilizers, dyes, pigments, plasticizers, flame retardants, and curing agents (if required) may also be employed. Exemplary pigments may include clays, titanium dioxide, carbon black, graphite, and colored lakes and toners. Suitable foaming agents and stabilizers include ammonium stearate, sodium lauryl sulfate, etc.

The penetration of moisture into the creped paper from the foamed aqueous dispersion or solution during formation of the laminate should be minimized to prevent excessive absorption of moisture by the paper prior to the setting or gelling of the foam. While some moisture will inherently penetrate the creped paper upon contact with the foam due to the inherent porosity of the paper, the presence of excessive moisture in the creped paper will disadvantageously cause the crepe in the paper to be released. That is, if an excessive amount of moisture is absorbed by the paper, the paper will eventually stretch to such an extent that the surface of the paper will no longer exhibit the creped configuration which is essential to the practice of the present invention.

Normally, the crepe in the paper will begin to be released when the moisture content of the paper reaches about 7 to 10 percent by weight, depending upon what degree of stress the paper is under. The amount of moisture absorption which will cause the crepe to be released depends to a great extent upon the type of paper employed, etc.

It is therefore desirable to reduce the moisture content of the dispersion or solution of the film-forming material to only that moisture content required to permit stable foaming so that excessive moisture will not be present which could release the crepe upon being absorbed by the paper. Generally, the moisture content of the dispersion or solution will range from about 20 to about 80 percent by weight. However, the moisture content of the dispersion or solution can range as low as about 5 percent by weight based upon the weight of the dispersion or solution and still enable a foam to be formed therefrom. A preferred moisture content of the dispersion or solution of the film-forming material ranges from about 20 to about 60 percent by weight.

Concomitantly, the solids content (i.e., the amount of non-volatile components present) will generally range from about 20 to about 95 percent by weight based upon the weight of the solution or dispersion. The moisture content depends upon the specific materials used, with a higher solids content of the foam correspondingly decreasing the percentage moisture content of the foam.

The penetration (i.e., the absorption) of moisture into the paper may be controlled and minimized in several other ways. The creped paper may be dried prior to being employed in the production of the laminated product in order to reduce the inherent moisture content of the paper. For example, the inherent moisture content may be reduced from a normal content of about 3 to about 12 percent by weight (depending upon conditions of temperature and humidity) to about 2 percent by weight by drying the paper prior to formation of the laminate. In this manner, the paper may thereafter absorb amounts of moisture ranging up to about 5 to about 8 percent by weight in addition to that which it already contains, thus providing a total moisture content of from about 7 to about 10 percent by weight or less, without causing the crepe in the paper to be released.

Naturally, a light weight creped paper sheet (e.g., tissue weight paper) will normally be able to absorb less moisture on a per weight basis than a heavier weight creped paper (e.g., towel weight paper) before the crepe in the crepe is released. In addition, creped paper produced from a dry creping process is more sensitive to moisture absorption than crepe paper produced from a wet creping process. That is, the creped paper from the wet creping process will be able to absorb more moisture on a per weight basis than the paper produced from a dry creping process without releasing the crepe.

The laminated paper product of the present invention may thus be produced by preparing the aqueous dispersion or solution of the film-forming material, forming a foam from the dispersion or solution, applying the foam in an unset or ungelled state to the desired creped paper substrate, and causing the foamed film to set or gel such that the amount of water absorbed by the paper is insufficient to cause the crepe in the paper to be released. The foam may be applied between opposing surfaces of two layers or webs of creped paper by suitable means (e.g. by extrusion), with the two layers or webs then being sufficiently brought together by suitable means to form the laminate without causing a significant collapse of the foam (e.g. by means of controlled gap rollers). The foam may also be applied to one or both sides of a single layer or web of creped paper. The foam is then caused to set or gel at which time it becomes bonded to the surface of the paper. The foam may be formed on the surface of the creped paper such that either a continuous or discontinuous (e.g. patterned) film is produced.

If a laminated product is desired which comprises only one layer of creped paper which is covered on either one or both sides with a set or gelled foam layer, the dispersion or solution may be applied to the surface of a web (in either a foamed or unfoamed state) and proportioned by suitable means (e.g., by the knife-over-roll technique) prior to setting or gelling the foam.

Generally any suitable conventional equipment may be used to physically apply the unset or ungelled dispersion or solution of the film-forming material which enables it to be deposited and uniformly spread across the surface of the creped paper to form a film thereon. The determination of which equipment is suitable for the deposition of the dispersion or solution (in either a foamed or unfoamed state) is well within the skill of the artisan.

The foam may be formed prior to application to the paper by entraining sufficient air into the aqueous solution or dispersion by suitable means. A preferred method of providing a foamed aqueous dispersion or solution of the film-forming material is by mechanically whipping air into the dispersion or solution until a suitable foam is provided.

The paper product of the present invention may also be produced by incorporating a suitable foaming agent into the aqueous dispersion or solution of the film-forming material, applying the solution or dispersion (in an unfoamed state) to the paper substrate as described above, forming the foam by action of the foaming agent together with any necessary heating, and causing the foamed film which is formed to set for gel. The use of such foaming agents is known and it is within the skill of the artisan to form the foam in this manner.

If a foaming agent is used to form the foam, the foam should be formed as soon as possible subsequent to the application of the aqueous solution or dispersion to the creped paper substrate in order to minimize the penetration of moisture into the paper during the formation of the laminate. Preferably, the foam is formed substantially immediately upon application of the aqueous solution or dispersion to the substrate by application of heat to activate the foaming agent.

The foam which is formed will generally have a thickness of up to about 1000 mils, preferably from about 1 mil to about 125 mils, and most preferably from about 10 to about 50 mils upon being set or gelled. The thickness of the foam layer should be sufficient to impart the desired properties of bulk, wet strength, and absorbency to the laminated product upon being set or gelled.

Most preferably, the foamed film is caused to set substantially immediately upon being formed on the paper to ensure that the paper does not absorb sufficient moisture from the film prior to the setting or gelling thereof to cause the crepe in the paper to be released. The foamed layer may be encouraged to set or gel substantially immediately upon being formed on the creped paper by preheating the paper prior to the formation of the foamed film. Such preheating will also serve to dry the laminated product and prevent excessive moisture absorption. The paper, if preheated, will generally be heated to temperatures ranging from about 100 to about 400° F.

The paper (e.g. in the form of a web) may also be passed through controlled nip rollers which are preheated to provide a somewhat instantaneous heating effect to quickly set or gel the foam and initiate the setting process. Microwave or dielectric heating may also be employed in an attempt to set the foam substantially immediately upon application or formation. However, the creped paper should not be heated to such an extent that the foam will break down as it contacts the paper due to the surface temperature of the paper.

Laminates formed from the paper sheets which are sensitive to moisture absorption (e.g. light weight creped tissue paper) may advantageously be dried subsequent to the formation of the foamed layer thereon to prevent an excessive amount of moisture from being absorbed by the paper. Such drying would normally be in addition to a setting or gelling step. On the other hand, a heavier weight sheet may not have to be dried (i.e, the foam need only be set or gelled), since the total amount of water which is absorbed by the paper may be insufficient to cause a release of the crepe.

If it is desired to dry the laminate subsequent to its formation (e.g., in the case of tissue weight creped paper where the excessive absorption of moisture may be a problem), any suitable method may be used. For example, the laminate may be passed through a drying chamber wherein heated air is directed onto the laminate. Typical drying temperatures (i.e., in the case of hot air or an oven) will generally range from about 200° F. to about 650° F. depending upon the residence time of the laminate in the oven. In such cases, the laminate is dried soon enough after its formation to avoid substantial penetration of moisture into the paper web so as to prevent a significant release of the crepe.

The time within which significant drying must occur under these circumstances will vary depending upon the moisture content of the foam, the viscosity of the dispersion or solution, the porosity of the paper, the thickness of the foam layer, etc. Naturally, the use of a highly porous creped paper or a foam having a high moisture content could necessitate that the laminate be dried fairly soon after being formed. It is also possible that the foam will be caused to set or gel during the drying process depending upon the specific drying temperatures and type of foam employed. The drying rate is determined so as to avoid such rapid removal of moisture from the foam such that the structure of the foam is destroyed.

It should be noted that as the foam begins to set and form a foamed film which is bonded to the layer or layers of the paper substrate, the resulting matrix structure of the foam will impart some rigidity to the creped paper and thereafter inhibit the crepe from being released (i.e., by inhibiting the paper from stretching). After that point has been reached, the absorption of excessive moisture by the paper will no longer be a problem. That is, the paper can then absorb moisture in amounts greater than the amounts which would normally cause the crepe to be released. It is thus highly desirable to cause the foam to set as soon as possible subsequent to being formed upon a surface of the creped paper.

When a paper product is produced comprising two layers of creped paper bonded together by a foamed layer, it may be advantageous to feed a scrim web between the separate layers (in the form of webs) of creped paper along with the dispersion or solution as the webs pass between controlled nip rollers. In this way, a laminated paper product is produced having two outer creped paper layers bonded together with a thin foamed film having disposed therein a scrim layer. The scrim layer enhances the durability of the laminated product and permits the product to be used under conditions wherein greater amounts of stress may be placed upon the product without any tearing of the laminate taking place.

The present invention is additionally illustrated in connection with the following Examples which are to be considered illustrative of the present invention but should not be considered limiting thereto.

EXAMPLES 1–4

Several laminated foam-creped paper products of the present invention are produced using the foam formulations set forth below in Table I:

TABLE I

| Foam Formulation (Wt, grams) | | |
|---|---|---|
| | X | Y |
| Hycar 1572 × 45[1] | 214.0 | 214.0 |
| Triton X-100[2] | 1.0 | 1.0 |
| Ammonium stearate[3] | 12.0 | 12.0 |
| Spray Satin[4] | 40.0 | 140.0 |
| Cellosize QP-52,000[5] (5% solids) | 10.0 | 10.0 |
| Percent Solids[6] | 52.5 | 65.1 |

[1] Nitrile latex composition marketed by B.F. Goodrich Chemical Co.
[2] Surfactant marketed by Rohm and Haas
[3] Emulsion grade marketed by Procter and Gamble Co.
[4] Clay filler marketed by Englehard Minerals and Chemicals Co.
[5] Thickening agent marketed by Union Carbide
[6] Percent solids is defined as the ratio of non-volatile components to the total weight of the formulation × 100.

The foamed dispersions which are used in the preparation of the foam-creped paper laminates of Examples 1 to 4 of Tables II and III are prepared by pre-mixing all materials except for the clay filler and stirring the admixed materials for approximately five minutes. The clay filler is then slowly added and the dispersion mixed for an additional five minutes. The dispersion is frothed (i.e., foamed) by whipping at high speed in a Hobart mixer for four minutes followed by whipping at low speed for two minutes. Either of the foamed dispersions (i.e., X or Y) is then fed between opposing surfaces of advancing webs of single ply tissue weight creped paper as the webs pass between application rollers set to a desired gap between 0.020 and 0.040 inches. Approximately 6 seconds later, the coated webs pass through a drying oven wherein hot air at a temperature of 320° F. and a velocity of 1400 ft/minute impinges upon the webs to dry the laminate and set the foam. The webs are heated to about 200° F. as they pass through the oven. The residence time of any specific portion of a web as it passes through the oven is about 15 seconds. The laminated product which exits from the drying oven consists of two webs of creped tissue paper bonded together with a layer of dried set or gelled foam.

The specific conditions employed during the various Examples and the characteristics of the laminated foam-creped paper products produced therein are set forth in the following Tables:

TABLE II

| Summary of Conditions of Coating Runs | | | |
|---|---|---|---|
| Example | Foam Formulation[a] | Wet Foam Density (g/cc) | Gap Setting (in) | Web Speed (ft/min) |
| 1 | Y | 0.23 | 0.020 | 50 |

TABLE II-continued

Summary of Conditions of Coating Runs

| Example | Foam Formulation[a] | Wet Foam Density (g/cc) | Gap Setting (in) | Web Speed (ft/min) |
|---|---|---|---|---|
| 2 | X | 0.09 | 0.030 | 50 |
| 3 | Y | 0.23 | 0.030 | 50 |
| 4 | X | 0.09 | 0.040 | 50 |

[a] See Table I for the composition of the formulations employed.

TABLE III

Characteristics of Foam-Creped Paper Laminates

| Example | Laminate Thickness (in) | Absorbency Gms H2O/in² | Tensile Strength[a] (lb/in) Dry | Wet |
|---|---|---|---|---|
| 1 | 0.018 | 0.191 | 7.9 | 2.2 |
| 2 | 0.014 | 0.200 | 8.1 | 2.3 |
| 3 | 0.027 | 0.260 | 6.8 | 1.7 |
| 4 | 0.016 | 0.197 | 7.3 | 1.9 |
| Control (2-ply tissue weight creped paper)[b] | 0.006 (2-ply paper thickness) | 0.196 | 4.7 | 1.2 |

[a] Machine direction (MD)
[b] 15#/3000 ft² non-wet strength tissue paper

The absorbency of each of the laminates produced is measured by immersing a 2 by 2 inch square portion of each laminate in water for ten seconds. The portion is then removed, allowed to drain for 3 to 4 seconds in a vertical position, and then weighed. The wet weight of the laminate is then compared to the dry weight of the laminate prior to immersion and absorbency determined.

The tensile strength of each of the laminates is measured on an Instron tester by methods essentially described in TAPPI standards T-404 TS-66 (for dry tensile strength) and T-456 OS-68 (for wet tensile strength).

As may be seen from the data contained within Table III, the foam-creped paper laminates of the present invention exhibit tensile strengths (both dry and wet) which are significantly greater than the tensile strengths exhibited by the control 2-ply tissue weight creped paper. The differences in wet tensile strength are particularly noteworthy. As an additional advantage, an increase in absorbency on a per square inch basis can also be achieved with the laminated products of the present invention in comparison with the control (2-ply tissue weight paper).

COMPARATIVE EXAMPLES A-D

In order to more clearly demonstrate the advantages of employing creped paper in the products of the present invention, foam-paper laminates are prepared using non-creped tissue weight paper. Foam formulation Y, the composition of which is described in Table I, is used to form the laminates of Comparative Examples A, B, C and D. These laminates are prepared by passing two separate layers of 2-ply tissue weight non-creped paper between controlled gap rollers set at a gap of 0.015 inch for Comparative Example A and 0.030 inch for Comparative Examples B, C and D. Three different types of non-creped tissue weight paper are employed. The foam formulation (in an unset state) is placed between the two separate layers of single ply paper prior to their passage between the rollers. The laboratory-prepared laminates thus formed are heated in an oven at 225° F. for five minutes in order to set (i.e., cure) the foam. The characteristics of the laminates produced are set forth in Table IV.

TABLE IV

Characteristics of Foam-Non-Creped Paper Laminates

| Comparative Example | Laminate Thickness (in) | Absorbency Gms H2O/in² | Tensile Strength (lb/in) Dry | Wet |
|---|---|---|---|---|
| A[a] | 0.020 | 0.083 | 6.3 | 0.5 |
| B[a] | 0.040 | 0.270 | 5.7 | 0.3 |
| C[b] | 0.040 | 0.350 | 8.2 | 0.5 |
| D[c] | 0.038 | 0.260 | 7.9 | 0.8 |
| Control #1 (2-ply tissue weight non-creped paper)[a] | 0.003 (2-ply paper thickness) | 0.092 | 6.4 | 0.4 |
| Control #2 (2-ply tissue weight non-creped paper)[b] | 0.004 (2-ply paper thickness) | 0.120 | 5.4 | 0.6 |
| Control #3 (2-ply tissue weight non-creped paper)[c] | 0.003 (2-ply paper thickness) | 0.104 | 4.6 | 0.6 |

[a] 10#/3000 ft² bleached kraft M.F. tissue paper
[b] 10#/3000 ft² semi-bleached kraft M.F. tissue paper
[c] 10#/3000 ft² unbleached kraft M.F. tissue paper A comparison of Tables III and IV indicates that the use of creped paper as opposed to non-creped paper in the production of the paper laminates of the present invention provides several advantages.

For instance, while the tensile strength of each of the dry laminates produced from either creped or non-creped paper is generally greater than the tensile strength of each dry control paper (creped or non-creped), only the laminates which contain creped paper exhibit a significant increase in either dry or wet tensile strength.

Surprisingly, the wet tensile strength of the laminates which contain non-creped paper differs little from the wet tensile strength of the control paper. On the other hand, the wet tensile strength of the laminates of the present invention (which contain creped paper) all exhibit significant increases over the wet tensile strength of the control creped paper. In fact, the increases in wet tensile strength range from about 50 percent to about 100 percent.

Such comparisons are even more striking when it is noted that the laminates of Comparative Examples B, C and D are much greater in cross-sectional thickness than the laminates of Examples 1 to 4 (i.e., from about 1.5 to about 2.5 times greater in thickness). This significant increase in thickness (which consists of additional foam) does not enhance the wet tensile strength characteristics of the laminates which employ a non-creped paper. To the contrary, the wet tensile strength of the laminates remains basically unchanged in relation to the wet tensile strength of the control paper. The laminates of the present invention are thus able to achieve desirable values for wet tensile strength without requiring a great increase in the bulk or weight of the paper laminate.

In addition, it should be noted that the laminate of Comparative Example A, whose thickness substantially corresponds to the thickness of the laminate of Example 1 exhibits an absorbency (on the basis of surface area)

which is significantly lower than the absorbency of the laminates of Examples 1 to 4 (which employ creped paper). In fact, the laminate of Comparative Example A exhibits an absorbency which is less than half of the absorbency of any of the laminates of Examples 1 to 4, regardless of the thickness of the laminate. The thicknesses of the laminates employing non-creped paper had to be doubled to achieve a comparable absorbency. Note, in this regard, Comparative Examples B, C and D.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A method for the production of a laminated foam-creped paper product which exhibits improved wet strength and bulk, and is highly absorbent comprising:
    forming an unset and ungelled foamed film of an aqueous dispersion or solution of a film-forming material on at least one surface of creped paper; and
    causing said foamed film to set or gel such that the amount of moisture absorbed by the paper from the film prior to the setting or gelling of the film is insufficient to cause the crepe in the paper to be released whereupon a laminate is formed having a set or gelled foamed film having a thickness of from about 1 to about 125 mils which is bonded to said creped paper.

2. The method of claim 1 wherein said creped paper comprises creped tissue paper.

3. The method of claim 1 wherein said creped paper comprises towel weight creped paper.

4. The method of claim 1 wherein said foamed film is caused to set or gel substantially immediately upon formation by preheating said paper prior to the forming of a film thereon so that the film will begin to set or gel as it contacts the heated paper.

5. The method of claim 1 wherein said foamed film is caused to set or gel by heating said laminate subsequent to the formation of the film thereon.

6. The method of claim 1 wherein said foamed film is formed on at least one surface of said creped paper by foaming said aqueous dispersion or solution and applying the foamed dispersion or solution to the paper.

7. The method of claim 1 wherein said film is formed on at least one surface of said creped paper by applying said unset and ungelled dispersion or solution to the paper and thereafter foaming the dispersion or solution.

8. A method for the production of a laminated creped paper product which exhibits improved wet strength and bulk, and is highly absorbent comprising:
    forming an unset and ungelled foamed film of an aqueous dispersion or solution of a film-forming material between opposing surfaces of two layers of creped paper; and
    causing said foamed film to set or gel such that the amount of moisture absorbed by the paper prior to the setting or gelling of the film is insufficient to cause the crepe in the paper to be released whereupon a laminate is formed having a set or gelled foamed film which bonds said layers of paper together.

9. The method of claim 8 wherein said layers of creped paper comprise creped tissue paper.

10. The method of claim 8 wherein said layers of creped paper comprise towel weight creped paper.

11. The method of claim 8 wherein said foamed film is caused to set substantially immediately upon formation by preheating said creped paper prior to the forming of the film thereon so that the film will begin to set or gel as it contacts the heated paper.

12. The method of claim 8 wherein said foamed film is caused to set by heating said laminate subsequent to the formation of the film thereon.

13. The method of claim 8 wherein said foamed film is formed between opposing surfaces of two layers of creped paper by foaming said aqueous dispersion or solution and applying the foamed dispersion or solution between said opposing surfaces.

14. The method of claim 8 wherein the film is formed between opposing surfaces of two layers of creped paper by applying said unset and ungelled dispersion or solution between said opposing surfaces and thereafter foaming the dispersion or solution.

15. A laminated paper product produced according to the method of claim 1.

16. A laminated paper product produced according to the method of claim 8.

17. The method of claim 1 wherein the thickness of the set or gelled foam film ranges from about 10 to about 50 mils.

18. The method of claim 8 wherein the thickness of the set or gelled foam film ranges from about 1 to about 125 mils.

19. The method of claim 18 wherein the thickness of the set or gelled foam film ranges from 10 to about 50 mils.

* * * * *